(No Model.) 2 Sheets—Sheet 2.
G. C. PYLE.
LOCOMOTIVE.
No. 580,220. Patented Apr. 6, 1897.
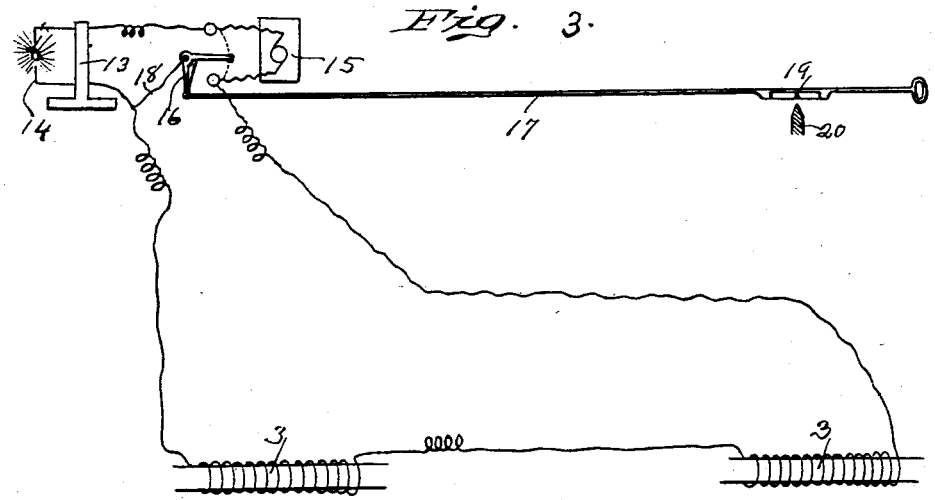
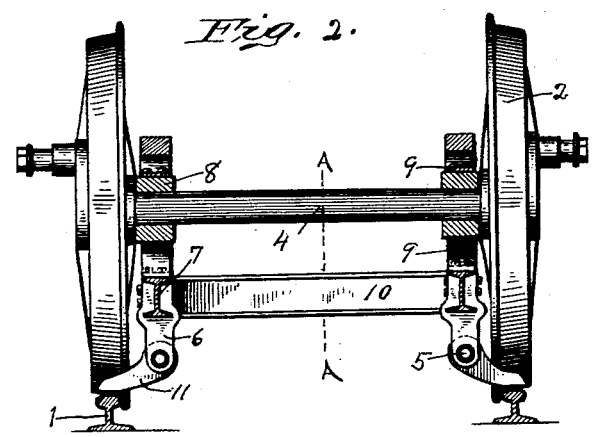
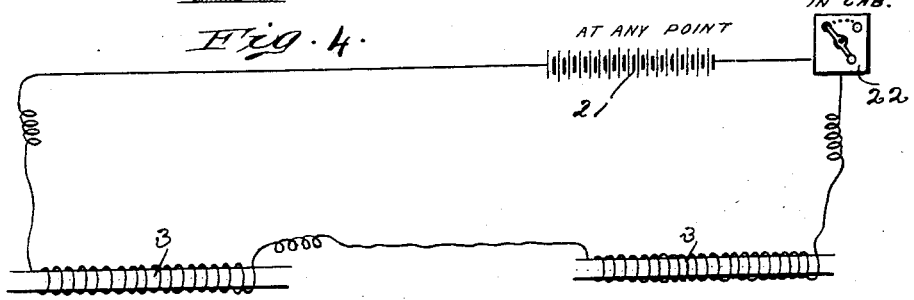
WITNESSES:
H. A. Beek
H. G. Study
INVENTOR
George C. Pyle
BY
V. H. Lockwood
His ATTORNEY.

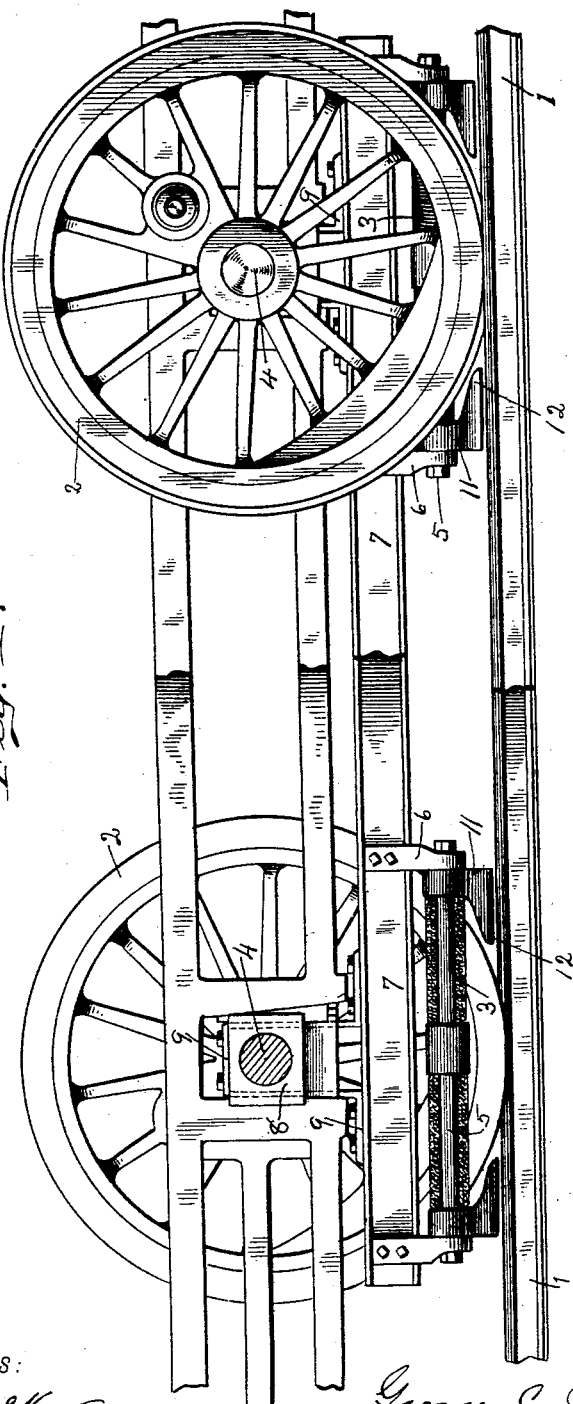

UNITED STATES PATENT OFFICE.

GEORGE C. PYLE, OF INDIANAPOLIS, INDIANA, ASSIGNOR OF ONE-HALF TO JOHN R. ALLEN, OF SAME PLACE.

LOCOMOTIVE.

SPECIFICATION forming part of Letters Patent No. 580,220, dated April 6, 1897.

Application filed August 19, 1896. Serial No. 603,200. (No model.)

*To all whom it may concern:*

Be it known that I, GEORGE C. PYLE, of Indianapolis, county of Marion, and State of Indiana, have invented a certain new and useful Improvement in Locomotives; and I do hereby declare that the following is a full, clear, and exact description thereof, reference being had to the accompanying drawings, in which like numerals refer to like parts.

My invention relates to means for increasing the traction-power of a locomotive.

I mount beneath the locomotive magnets, one near each wheel, preferably, with pole-pieces extending over and in close proximity to the rails on which the locomotive travels. The magnets are connected up with a suitable battery or dynamo carried on the locomotive, and the circuit between them may be closed or opened by a suitable switch operated from the cab. The principle upon which the magnets thus arranged increase the power of the locomotive is that the attraction between them and the rails causes them to tend to pull the locomotive down toward the rails like the addition of a great weight to it, and thus the effect in turn tends to increase the friction between the wheels and rails, and thus prevent the slipping of the wheels. The magnets have the same effect as an increase in the weight of the locomotive without the disadvantage of carrying the weight, thus being easy on the road-bed and bridges. They possess the further advantage that they can be cut out when not needed and cut in when starting or climbing a grade. They also make it needless often to sand the track. This, together with the prevention of slipping, tends greatly to prolong the life of the rails. The chief advantages, however, of the invention arise from the increase in the average number of freight-cars that may be drawn in the trains and the prevention of a passenger-train from leaving the track when traveling at a very high speed. Any tendency of the locomotive to rise or jump while under high speed can be instantly overcome by cutting in the magnets.

When an electric headlight is used on the same locomotive, instead of connecting up the magnets with a battery it can be connected up with the dynamo of the headlight apparatus, and by a suitable three-way switch the engineer can cut in the light or the magnets, or both, as he desires.

The nature of my invention is made more clear by the accompanying drawings and the following description.

Figure 1 is a side elevation of the drive-wheels of a locomotive and a portion of the framework with the magnets mounted in place, the left half being in section on the line A A of Fig. 2. Fig. 2 is an end view of a portion of the running-gear of a locomotive with the magnets in place. Fig. 3 is a diagram of the circuit when the magnets are connected up with an electric headlight-plant on the locomotive. Fig. 4 is a diagram of the circuit with a battery.

I show here the rails 1 of a railroad, and the drive-wheels 2 of a locomotive traveling thereon. The magnets 3 are mounted beneath the axles 4 of the wheels just inside the wheels. The core 5 is carried in brackets 6, suspended from a beam 7, that in turn is suspended from the boxes 8 by the straps 9. These parts should be strong and rigid. The supports for the magnets on the opposite sides are held in place by the cross-beam 10. From each end of the magnet a core-piece 11 extends in as close proximity with the rail 1 as is safe. These core-pieces are provided with extensions 12 to increase the surface to which the rail is exposed.

The foregoing will furnish an idea of one arrangement of parts for carrying out my invention. The location of the magnets on the locomotive is a matter of choice, as well as the number of them, so long as they will, when energized, attract the rails and tend to draw down the locomotive and hold it to the rails.

If the locomotive is supplied with an electric headlight, the magnets are preferably combined with it, as shown in Fig. 3. There 13 represents the frame of a lamp that carries the reflector. 14 is the lamp, and 15 is the dynamo. The lamp, magnets, and dynamo are connected in a circuit that is controlled by the switch-lever 16, operated from the cab by the push-lever 17. The switch is arranged to throw the lamp or magnet, or both, into the circuit, as described, through the wire 18.

The push-lever is notched at 19 in the cab to engage the catch 20, whereby it may be set and held in one position.

The magnets may be energized by a generator 21, as shown in Fig. 4. This may be located anywhere on the locomotive. A switch-board 22 in the cab enables the engineer to close the circuit when he wishes and use the magnets, and to leave it open at other times.

In the arrangement which I have shown and described I might add that the rail of the road serves as the armature of the magnet.

What I claim as my invention, and desire to secure by Letters Patent, is—

1. In a locomotive, the combination with a drive-wheel, its axle, the axle-box, and a rail on which said drive-wheel rests, of a magnet, and means for supporting said magnet from said axle-box in close proximity to the point of contact of the drive-wheel with the rail, the pole-pieces of said magnet extending in close proximity to the rail on which said drive-wheel rests.

2. In a locomotive, the combination with a drive-wheel, its axle, the axle-box, and a rail on which said drive-wheel rests, of a magnet, and means for supporting said magnet from said axle-box in close proximity to the point of contact of the drive-wheel with the rail, the pole-pieces of said magnet extending into close proximity to the rail on which said drive-wheel rests, one pole-piece being immediately in front of and the other in the rear of said wheel.

3. In a locomotive, a magnet mounted with its poles in close proximity to the rails on which the locomotive travels, a dynamo, an electric headlight fed by such dynamo, a three-way switch, and a circuit between such switch, dynamo, headlight and magnets.

4. In a locomotive, a magnet mounted with its poles in close proximity to the rails on which the locomotive travels, a dynamo, an electric headlight fed by such dynamo, a three-way switch, and a circuit between such switch, dynamo, headlight, and magnets, and a push-lever extending from the switch to the cab of the locomotive for operating the switch.

In witness whereof I have hereunto set my hand this 11th day of August, 1896.

GEORGE C. PYLE.

Witnesses:
V. H. LOCKWOOD,
DOYL COMER.